US012657308B2

(12) United States Patent
Gangaram et al.

(10) Patent No.: US 12,657,308 B2
(45) Date of Patent: Jun. 16, 2026

(54) SOFTWARE UPDATE ON A SECURED COMPUTING DEVICE

(71) Applicant: Microsoft Technology Licensing, LLC, Redmond, WA (US)

(72) Inventors: Vamsee Krishna Gangaram, Seattle, WA (US); Vikas Ahluwalia, Redmond, WA (US); Jerry Song Kim, Sammamish, WA (US); Robert D. Young, Kirkland, WA (US); Sudhir Vutharadhi, Monroe, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 224 days.

(21) Appl. No.: 18/511,391

(22) Filed: Nov. 16, 2023

(65) Prior Publication Data

US 2025/0165609 A1 May 22, 2025

(51) Int. Cl.
*G06F 21/57* (2013.01)
*G06F 8/65* (2018.01)

(52) U.S. Cl.
CPC .............. *G06F 21/575* (2013.01); *G06F 8/65* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 12,271,480 B2 * | 4/2025 | Patel | ..................... | G06F 21/602 |
| 2003/0018870 A1 * | 1/2003 | Abboud | ................ | G06F 3/0601 |
| | | | | 711/173 |
| 2004/0006688 A1 | 1/2004 | Pike et al. | | |
| 2013/0152074 A1 | 6/2013 | Yeh | | |
| 2015/0121356 A1 | 4/2015 | Yang et al. | | |
| 2017/0308706 A1 * | 10/2017 | Ray | ..................... | H04L 63/1441 |
| 2019/0243634 A1 * | 8/2019 | Lewis | ..................... | G06F 8/654 |
| 2019/0363894 A1 * | 11/2019 | Kumar Ujjwal | ...... | H04L 9/3268 |
| 2019/0384614 A1 * | 12/2019 | Kondapi | ............... | G06F 9/4408 |
| 2021/0133051 A1 * | 5/2021 | Kumarasamy | ...... | G06F 11/2094 |
| 2022/0197770 A1 * | 6/2022 | Tan | ..................... | G06F 11/327 |

(Continued)

FOREIGN PATENT DOCUMENTS

| | | |
|---|---|---|
| CN | 114124698 A | 3/2022 |
| CN | 116400938 A | 7/2023 |

OTHER PUBLICATIONS

"EFI system partition", Retrieved from: https://en.wikipedia.org/wiki/EFI_system_partition, Sep. 27, 2023, 4 Pages.

(Continued)

*Primary Examiner* — Christopher B Robinson
(74) *Attorney, Agent, or Firm* — Ray Quinney & Nebeker P.C.; Paul N. Taylor

(57) ABSTRACT
Systems and methods are provided that will automatically trigger a migration process on a secured computing device. A migration application may be remotely pushed to one or more secure computing devices. The secured computing device may set a boot priority for a new software on a first location on a hard drive. The secured computing device may detect an existence of a firmware migration variable and migrate the computing device to an updated state.

20 Claims, 6 Drawing Sheets

500

Setting a boot priority for a new software on a first location on a hard drive — 544

Detecting an existence of a firmware migration variable — 546

Migrating the computing device to an updated state — 548

(56) References Cited

U.S. PATENT DOCUMENTS

| | | | | |
|---|---|---|---|---|
| 2024/0028734 | A1* | 1/2024 | Savage | ................ G06F 21/572 |
| 2024/0028735 | A1* | 1/2024 | Savage | ................ H04L 9/0891 |

OTHER PUBLICATIONS

"Surface Hub 2S for Business", Retrieved from: https://www.microsoft.com/en-us/d/surface-hub-2s-for-business/8xgr3x8n3768?activetab=pivot:overviewtab, Retrieved Date: Jul. 13, 2023, 6 Pages.
"Surface Hub 3", Retrieved from: https://www.microsoft.com/en-us/surface/business/surface-hub-2, Retrieved Date: Jul. 13, 2023, 6 Pages.
"TianoCore EDK2 master", Retrieved from: https://bsdio.com/edk2/docs/master/_crypt_pkcs7_verify_eku_runtime_8c.html, Retrieved Date: Jul. 13, 2023, 2 Pages.
"Unified Extensible Firmware Interface Forum", Retrieved from: https://uefi.org/specifications, Retrieved Date: Jul. 13, 2023, 3 Pages.
"Use MDM to deploy software updates to Apple devices", Retrieved from: http://web.archive.org/ web/20230104063755/https:/support.apple.com/en-in/guide/deployment/depafd2fad80/web, Jan. 4, 2023, 8 Pages.
"User Datagram Protocol", Retrieved from: https://en.wikipedia.org/wiki/User_Datagram_Protocol, Sep. 27, 2023, 4 Pages.
Kaiser, et al., "Microsoft Surface Enterprise Management Mode (SEMM)", Retrieved from: https://learn.microsoft.com/en-us/surface/surface-enterprise-management-mode, Apr. 4, 2023, 8 Pages.

* cited by examiner

200

400

500

700

Memory 703

Instructions 705

Data 707

Processor 701

Communication Interface(s) 709

Input Device(s) 711

Output Device(s) 713

Display Device 715

Display Controller 717

719

SOFTWARE UPDATE ON A SECURED COMPUTING DEVICE

CROSS-REFERENCE TO RELATED APPLICATIONS

N/A

BACKGROUND

Computing devices that are located in communal areas (such as meeting rooms), or in public places (such as libraries or hotels) typically run a locked down version of the operating system (OS) to prevent malicious usage or software installations on them. These secured devices are designed to provide certain services to end users in a secured way despite the fact that they are open to the public. For example, the system of the secured computing device may prevent packet sniffing, and recording usernames and passwords used by other people to login to services.

BRIEF SUMMARY

In some embodiments, a method for triggering a migration process on a computing device having a secure boot configuration policy is provided. The method includes setting a boot priority for a new software on a first location on a hard drive. The method further includes detecting an existence of a firmware migration variable and migrating the computing device to an updated state.

In other embodiments, a method for triggering software migration process on a computing device running a current software is provided. The method includes detecting an existence of a migration application on the computing device, and the migration application triggers the software migration process including downloading a new software image to a first location on a hard drive, setting a firmware migration variable for a software migration, and booting up the computing device. The method further includes detecting the existence of the firmware migration variable for the software migration and performing the software migration.

In yet other embodiments, a method for triggering software migration process on one or more secured computing devices is provided. The method includes accessing a management service and pushing a migration application to selected one or more secured computing devices where the one or more secured computing devices are triggered by the migration application to begin migration process after a reboot of the one or more secured computing devices.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to remotely providing targeted operating system upgrades on a secured computing device. Computing devices that are located in communal areas (such as meeting rooms), or in public places (such as libraries or hotels) typically run a locked down version of the operating system (OS) to prevent malicious updates or software installations on them. These type of secured computing devices running a locked down version of the OS conventionally need to be manually updated by an IT administrator on-site to transition to a new OS. When an organization has plurality of secured computing devices on their facilities, updating each secured computing device individually can take a lot of time.

In addition, these secured computing devices typically include a secure booth configuration policy (SBCP) on their firmware (such as the UEFI system partition) and a firmware policy variable which enforce desired security policies on the computing device. When a computing device boots up, these policies are applied to the OS to prevent tampering. In order to change the SBCP to allow an update to the OS, physical interaction by the IT administrator with the computing device is required. Furthermore, secured computing devices typically also include an anti-tampering mechanism that prevents deleting SBCP completely from the firmware. If the SBCP policies are not present when the computing device boots up or the firmware policy variable is tampered, the OS is configured to write it back to the storage media or a bootloader blocks boot to the new OS entirely.

The features and functionalities described herein provide a number of advantages and benefits over conventional approaches and systems. For example, the systems described herein provide features and functionalities relating to providing targeted operating system upgrades on one or more secured computing devices. Indeed, the systems described herein provide a system for allowing IT administrators to pick and choose which secured computing devices they wish to update, and to initiate the migration process remotely. One possible advantage of allowing IT administrators to remotely initiate update is that it saves time and is more convenient when there is no need to initiate it on-site.

In addition to initiating updates remotely, one or more embodiments of the system and methods described herein provide a system for maintaining integrity of the secured computing device by providing a secured method remotely to automatically modify the SBCP policy to allow OS update.

Figure 1:
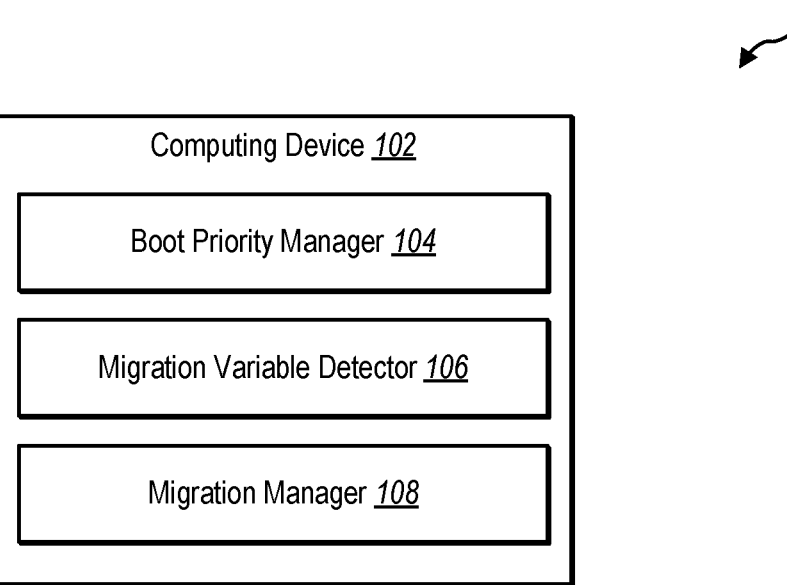
FIG. 1 illustrates an example environment showing a secured computing device capable of implementing a software update, in accordance with one or more embodiments.

FIG. 1 illustrates an example environment 100 showing a secured computing device 102 capable of implementing a software update, in accordance with one or more embodiments. In one or more embodiments, the computing device 102 is an appliance-based device. An appliance-based device may be a device that is configured to perform a limited number of functionalities. For example, an appliance-based device provided on a public library may only have capabilities to allow access to Internet, word processing applications (such as MS Word), spreadsheet editors (such as MS Excel), and printing content from the Internet, word processing applications and the spreadsheet editors, while any other capabilities have been disabled, such as downloading content to the device, storing content from external devices (such as USB memory device) and adjusting settings on the device. In another example, an appliance-based device may be an interactive whiteboard (such as Surface Hub) provided in a classroom of a school that runs specific applications and allows a user to interact only with the specific applications. In one or more embodiments, the secured computing device 102 runs a locked down version of the operating system (OS) to prevent malicious updates or software installations on them. In one or more embodiments, the secured computing device 102 includes a secure booth configuration policy (SBCP) on their firmware which enforces desired security policies on the computing device. For example, the firmware may be unified extensible firmware interface (UEFI).

As shown in FIG. 1, the computing device 102 includes a boot priority manager 104. In one or more embodiments, the boot priority manager 104 is configured to set a boot priority for a new software on a first location on a hard drive. In one or more embodiments, setting the boot priority for the new software forces the computing device 102 to boot the system from the first location on the hard drive after a computing device boot up. In one or more embodiments, the new software may be a new application (such as an Internet browser, or a word processing application), or an operating system (OS).

As shown in FIG. 1, the secured computing device 102 further includes a migration variable detector 106. In one or more embodiments, the migration variable detector 106 is configured to detect an existence of a firmware migration variable on the secured computing device 102. For example, in response to detecting the existence of the firmware migration variable, the secured computing device 102 is configured to boot up to the new software.

As shown in FIG. 1, the secured computing device 102 further includes a migration manager 108. In one or more embodiments, the migration manager 108 is configured to migrate the secured computing device 102 to an updated state. In one or more embodiments, the migration manager 108 is further configured to update a policy file stored in firmware before migrating the secured computing device 102 to the updated state and before booting up to the new software.

Figure 2:
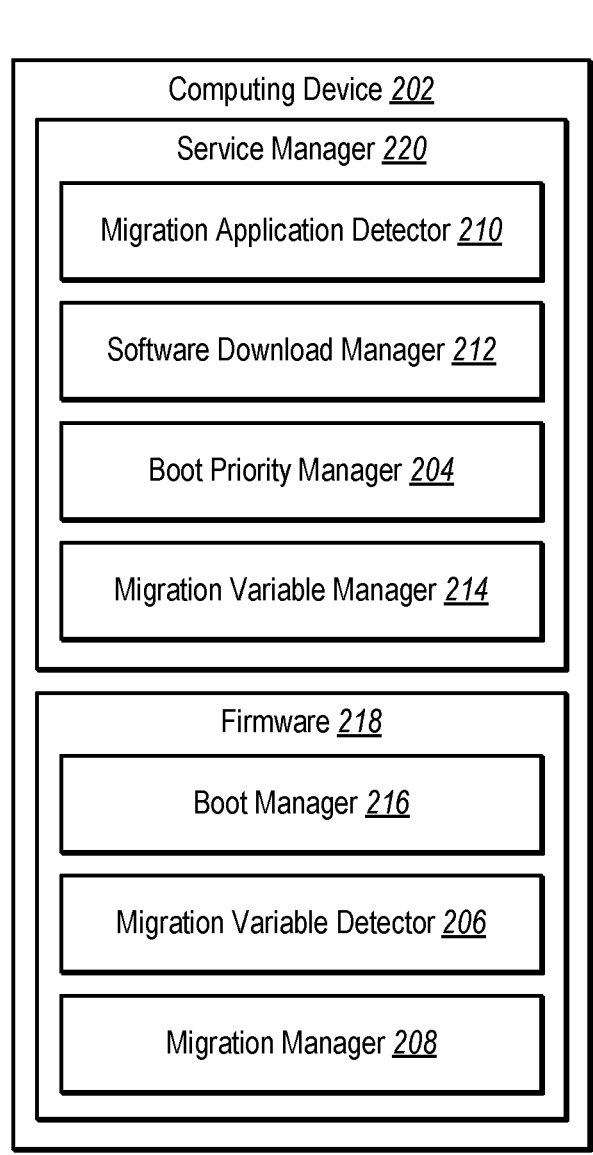
FIG. 2 illustrates an example environment showing a secured computing device capable of implementing a software update, in accordance with one or more embodiments.

FIG. 2 illustrates an example environment 200 showing a secured computing device 202 capable of implementing a software update, in accordance with one or more embodiments. In one or more embodiments, the computing device 202 is an appliance-based device, such as the secured computing device 102 explained in connection with FIG. 1. As shown in FIG. 2, the secured computing device 202 includes a service manager 220 and firmware 218. In one or more embodiments, the service manager 220 is a software component configured to provide plurality of services and functionalities for the secured computing device 202. For example, touch screen control, device synchronization, firmware updates, and other device-specific features. In one or more embodiments, the firmware 218 is a software component configured to provide low-level control for the secured computing device's 202 hardware. For example, firmware may be basic input output system (BIOS), unified extensible firmware interface (UEFI), and extensible firmware interface (EFI).

As shown in FIG. 2, the service manager 220 includes a migration application detector 210. In one or more embodiments, the migration application detector 210 is configured to detect an existence of a migration application on the computing device, wherein the migration application triggers a software migration process. In one or more embodiment, the migration application is an IT administered application specifically designed to trigger a migration process on a secured computing device 202. Additional details on how a migration application may be delivered to the secured computing device 202 is further discussed in connection to FIG. 4. In one or more embodiments, the service manager 220 is configured to verify a signature of the migration application. For example, the service manager 220 may store a plurality of verified signatures and compare the signature of the migration application to the plurality of verified signatures before allowing the software migration process.

In one or more embodiments, the software migration process further includes identifying a computing device type and a current software running on the secured computing device 202. For example, the computing device type may be identified as Surface Hub 2S and the current software running on the secured computing device 202 may be identified as Teams OS. In one or more embodiments, the computing device type may be read from SMBIOS stored in the firmware (e.g. at the UEFI firmware variable). In one or more embodiments, the migration application is configured to cross-reference the computing device type to a target computing device type identified by the migration application. For example, if the target computing device type is Surface Hub 2S and the computing device type is also Surface Hub 2S, then the migration process can proceed. In another example, if the target computing device is Surface Hub 2S and the computing device is Surface laptop, the migration process will not proceed as they do not match. In one or more embodiments, the migration application is further configured to cross-reference the current software running on the secured computing device 202 to a target software identified by the migration application. For example, if the target software is Teams OS, and the secured computing device 202 is running a Teams OS, then the migration application will proceed with the migration process. In another example, if the target software is Teams OS, but the secured computing device 202 is running Windows 10 OS, the migration application will not proceed with the migration process.

In one or more embodiments, the software migration process further includes repartitioning a hard drive on the secured computing device 202. In one or more embodiments, repartitioning the hard drive includes shrinking a current system partition. For example, the hard drive may not have enough space for downloading the new software image before shrinking the current system partition. In one or more embodiments, repartitioning the hard drive further includes creating a new system update partition. For example, when migrating from a current operating system (OS) to a new type of OS, by creating a new system update partition on the hard drive, the current OS and secure boot configuration policies are stored until the new OS has been installed.

As shown in FIG. 2, the service manager 220 further includes a software download manager 212. In one or more embodiments, the software download manager 212 is configured to download a new software image to a first location on the hard drive. In one or more embodiments, the first location on the hard drive is the new system update partition created during the software migration process as discussed earlier. In one or more embodiments, the new software image is a new operating system (OS) image. In one or more embodiments, the software download manager 212 is configured to download the new software image from a remote site. For example, the software download manager 212 may download the new software image from a publicly available store, such as Microsoft store, Microsoft Download Center, App store, or Google play. In one or more embodiments, the software download manager 212 is configured to access a private application and device management system that allows verified users (such as IT administrators) to download approved software to the secured computing device 202. For example, the private application and device management system may be Microsoft Intune, Google Endpoint Management, or Apple Business Manager. In one or more embodiments, the software download manager 212 is provided with an appropriate URL address, by the migration application, to download the new software image. In one or more embodiments, the software download manager 212 uses a hardcoded redirect URL to download the new software image. For example, the software download manager 212 may use the hardcoded redirect URL to access a designated redirect link, and the designated redirect link may forward the request to the correct URL to download the new software.

In one or more embodiments, the software download manager 212 is configured to determine a locale type of the secured computing device 202 and select from a plurality of new software locale types at the remote site a matching locale type for downloading. For example, if the locale type of the secured computing device 202 is North America, the software download manager 212 is configured to download a new software having a matching locale type, i.e., Noth America locale type. Different locale type software may include for example different language options, and other country specific configurations.

As shown in FIG. 2, the service manager 220 further includes a boot priority manager 204. In one or more embodiments, the boot priority manager 204 is configured to set a boot priority for the new software on the first location on the hard drive. In one or more embodiments, setting the boot priority for the new software forces the computing device 202 to boot the new software from the first location on the hard drive after a computing device boots up. In one or more embodiments, the new software may be a new application (such as an Internet browser, a word processing application, or an operating system (OS)).

A shown in FIG. 2, the service manager 220 further includes a migration variable manager 214. In one or more embodiments, the migration variable manager 214 is configured to set a firmware migration variable for the software migration. In one or more embodiments, the firmware migration variable is configured to notify the firmware during a boot up that the software migration process has started.

As shown in FIG. 2, the firmware 218 includes a boot manager 216. In one or more embodiments, the boot manager 216 is configured to boot up the secured computing device 202. For example, after the service manager 220 has initiated the software migration process including downloading a new software image, setting a boot priority for the new software, and setting a firmware migration variable for the software migration, the service manager 220 may instruct the boot manager 216 to boot up the secured computing device 202.

As shown in FIG. 2, the firmware 218 further includes a migration variable detector 206. In one or more embodiments, the migration variable detector 206 is configured to detect an existence of the firmware migration variable on the secured computing device 202 set by the migration variable manager 214. For example, in response to detecting the existence of the firmware migration variable, the secured computing device 202 is configured to delete current policy files stored in the firmware and to delete the firmware migration variable set by the migration variable manager 214 before booting up to the new software.

As shown in FIG. 2, the secured computing device 202 further includes a migration manager 208. In one or more embodiments, the migration manager 208 is configured to perform migration on the secured computing device 202. For example, the migration manager 208 may install the new software and delete the new system update partition. In one or more embodiments, the migration manager 208 is further configured to update a policy file stored in firmware 218 when migrating the secured computing device 202 to the updated state.

Figure 3:
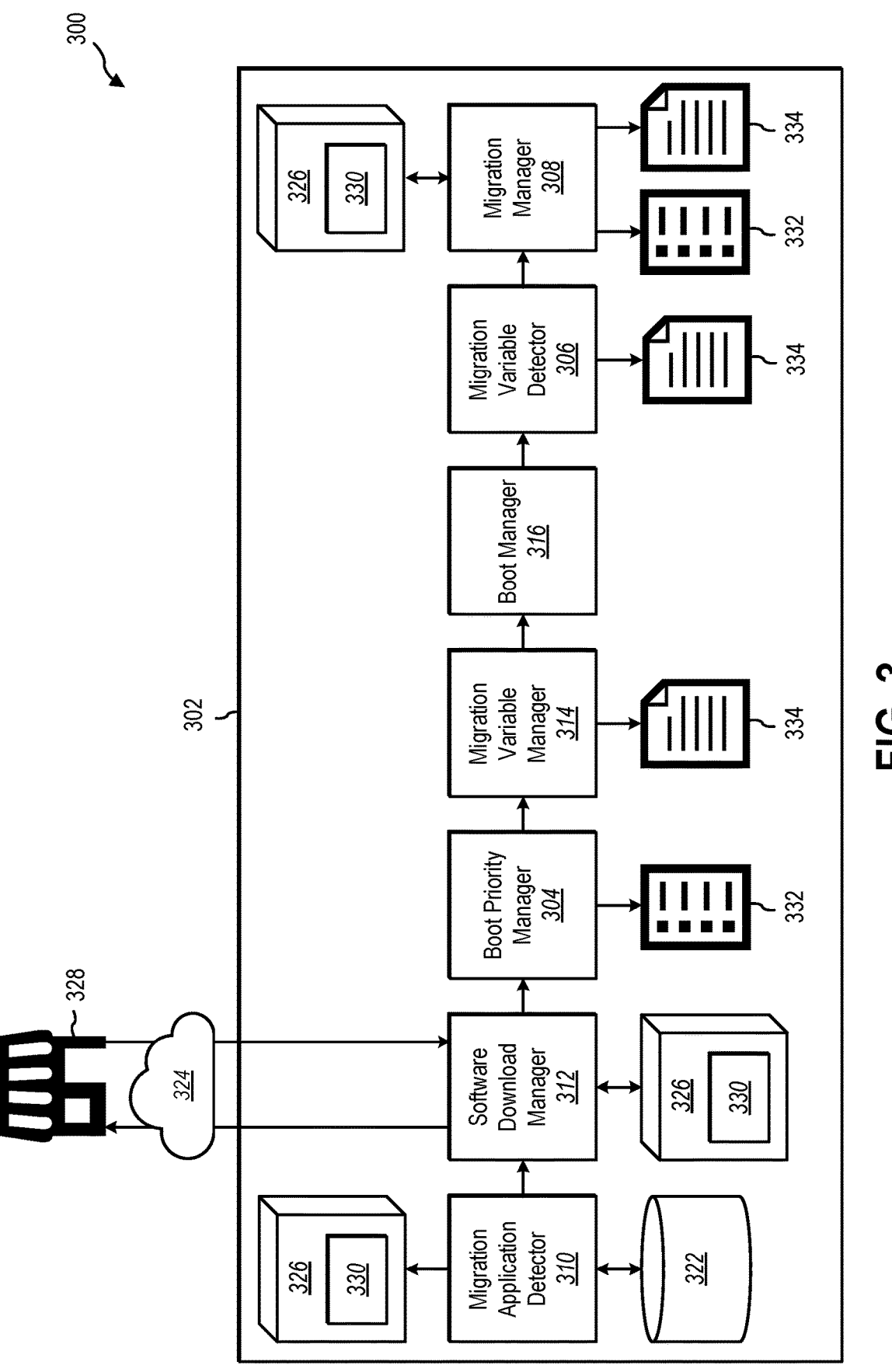
FIG. 3 is a diagram illustrating an example workflow of a possible implementation of a software migration on a secured computing device, in accordance with one or more embodiments.

FIG. 3 is a diagram illustrating an example workflow 300 of a possible implementation of a software migration on a secured computing device, in accordance with one or more embodiments.

In one or more embodiments, a migration application detector 310 is configured to detect an existence of a migration application on the computing device, wherein the migration application triggers a software migration process. In one or more embodiments, the migration application is an IT administered application specifically designed to trigger a migration process on a secured computing device. Additional details on how a migration application may be delivered to the secured computing device 202 is further discussed in connection to FIG. 4. In one or more embodiments, the migration application detector 310 is configured to verify a signature of the migration application. In one or more embodiments, the secured computing device may store a plurality of verified signatures in a secured data storage 322. The migration application detector 310 may compare the signature of the migration application to the plurality of verified signatures stored in the secured data storage 322. If the signature of the migration application matches one of the verified signatures stored at the secured data storage 322, the software migration process is allowed to proceed.

In one or more embodiments, the migration application detector 310 identifies a computing device type and a current software running on the secured computing device. For example, the computing device type may be identified as Surface Hub 2 and the current software running on the secured computing device may be identified as Teams OS. In one or more embodiments, the migration application is configured to cross-reference the computing device type to a target computing device type identified by the migration application. For example, if the target computing device type is Surface Hub 2 and the computing device type is also Surface Hub 2, then the migration process can proceed. In another example, if the target computing device is Surface Hub 2S and the computing device is Surface laptop, the migration process will not proceed as they do not match. In one or more embodiments, the migration application detector 310 is further configured to cross-reference the current software running on the secured computing device to a target software identified by the migration application. For example, if the target software is Teams OS, and the secured computing device is running a Teams OS, then the migration application will proceed with the migration process. In another example, if the target software is Teams OS, but the secured computing device 202 is running Windows 10 OS, the migration process is not allowed to proceed.

In one or more embodiments, the migration application detector 310 further includes repartitioning a hard drive 326 on the secured computing device 302. In one or more embodiments, repartitioning the hard drive 326 includes shrinking a current system partition. For example, the hard drive 326 may not have enough space for downloading the new software image before shrinking the current system partition. In one or more embodiments, repartitioning the hard drive further includes creating a new system update partition 330. For example, when migrating from a current operating system (OS) to a new type of OS, by creating a new system update partition 330 on the hard drive, the current OS and secure boot configuration policies are stored until the new OS has been installed.

After the migration application detector 310 has verified the validity of the migration application, verified that the device type and current software running on the secured computing device match with the target device and target software, and repartitioned the hard drive 326, the software download manager is triggered to download a new software image to a first location on the hard drive 326. In one or more embodiments, the first location on the hard drive is the new system update partition 330 created during the software migration process as discussed earlier. In one or more embodiments, the new software image is a new operating system (OS) image. In one or more embodiments, the software download manager 312 is configured to download the new OS image from a remote site 328, through a public network 324. For example, the remote site 328 may be a publicly available store, such as Microsoft store, Microsoft Download Center, App store, or Google play to download the new software image. In one or more embodiments, the remote site 328 may be a private application and device management system that allows verified users (such as IT administrators) to download approved software to the secured computing device 302. For example, the private application and device management system may be Microsoft Intune, Google Endpoint Management, or Apple Business Manager.

In one or more embodiments, the software download manager 312 is configured to determine a locale type of the secured computing device 302 and select from a plurality of new software locale types at the remote site 328 a matching locale type for downloading. For example, if the locale type of the secured computing device 302 is North America, the software download manager 312 is configured to download a new software having a matching locale type, i.e., Noth America locale type.

After the software download manager 312 has downloaded the new software image to a first location 330 on the hard drive 326, the migration process triggers a boot priority manager 304 to set a boot priority for the new software on the first location 330 on the hard drive 326. For example, the boot priority manager 304 may rewrite a policy file 332 stored at the secured computing device 302 with a new location (e.g., the first location 330). In one or more embodiments, the first location is the new system update partition.

In one or more embodiments, setting the boot priority for the new software forces the computing device 302 to boot the new software from the first location 330 on the hard drive 326 after a computing device boots up. In one or more embodiments, the new software may be a new application (such as an Internet browser, a word processing application, or an operating system (OS)).

After the boot priority manager 304 has set the boot priority, the migration process triggers a migration variable manager 314 to set a firmware migration variable 334 for the software migration. For example, the migration variable manager 314 may set an OS migration UEFI runtime variable 334. In one or more embodiments, the firmware migration variable (e.g., the UEFI runtime variable) is configured to notify the firmware during the next boot up that the software migration process has started.

After the migration variable manager 314 has set a firmware migration variable, the migration process triggers a boot manager 316 to boot up the secured computing device 302. For example, the secured computing device 302 may perform a warm reset as instructed by the boot manager 316. A warm reset closes all running programs, including the software migration application program and reinitiates a boot sequence automatically. After the warm reset, a migration variable detector 306 detects an existence of the firmware migration variable 334 on the secured computing device 302 set by the migration variable manager 314. For example, in response to detecting the existence of the firmware migration variable 334, the secured computing device 302 is configured to delete current policy files stored in the firmware and to delete the firmware migration variable set by the migration variable manager 314 before booting up to the new software.

Next, a migration manager 308 is configured to perform migration on the secured computing device 302. For example, the migration manager 308 may install the new software and delete the new system update partition 330 from the hard drive 326.

Figure 4:
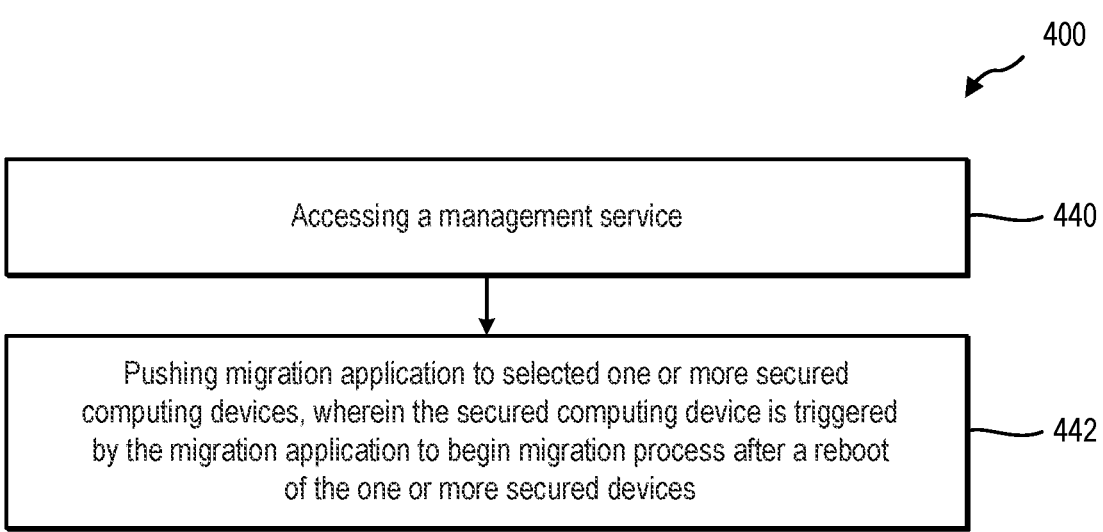
FIG. 4 illustrates a series of acts for triggering a software migration process on one or more secured computing devices, in accordance with one or more embodiments.

FIG. 4 illustrates a series of acts 400 for triggering software migration process on one or more secured computing devices, in accordance with one or more embodiments. While FIG. 4 illustrates acts according to one or more embodiments, alternative embodiments may omit, add to, reorder, and/or modify any of the acts shown in FIG. 4. The acts of FIG. 4 can be performed as part of a method. Alternatively, a non-transitory computer-readable medium can include instructions that, when executed by one or more processors, cause a computing device to perform the acts of FIG. 4. In still further embodiments, a system can perform the acts of FIG. 4.

As shown in FIG. 4, the series of acts 400 may include an act 440 of accessing a management service. In one or more embodiments the management service may be a private application and device management system, such as Microsoft Intune, Google Endpoint Management, or Apple Business Manager. In one or more embodiments, the private application and device management system allows a verified administrator to manage a plurality of secured computing devices remotely, by allowing e.g., to push verified applications to one or more of the plurality of secured computing devices. In one or more embodiments, the management service may be an application running in the secured computing device that is accessible with administrative privileges. For example, when an IT administrator logs in to the secured computing device to manually trigger migration process by downloading a migration application to the secured device.

The series of acts 400 may further include an act 442 of pushing a migration application to selected one or more secured computing devices, wherein the secured computing device is triggered by the migration application to begin migration process after a reboot of the one or more secured devices. In one or more embodiments, the private application and device management system may be used to select one or more secured computing devices as targets for pushing the migration application into. For example, an IT administrator may first select only one secured device for migration to confirm that the migration is successful before pushing it to all other secured devices managed by the IT administrator.

Figure 5:
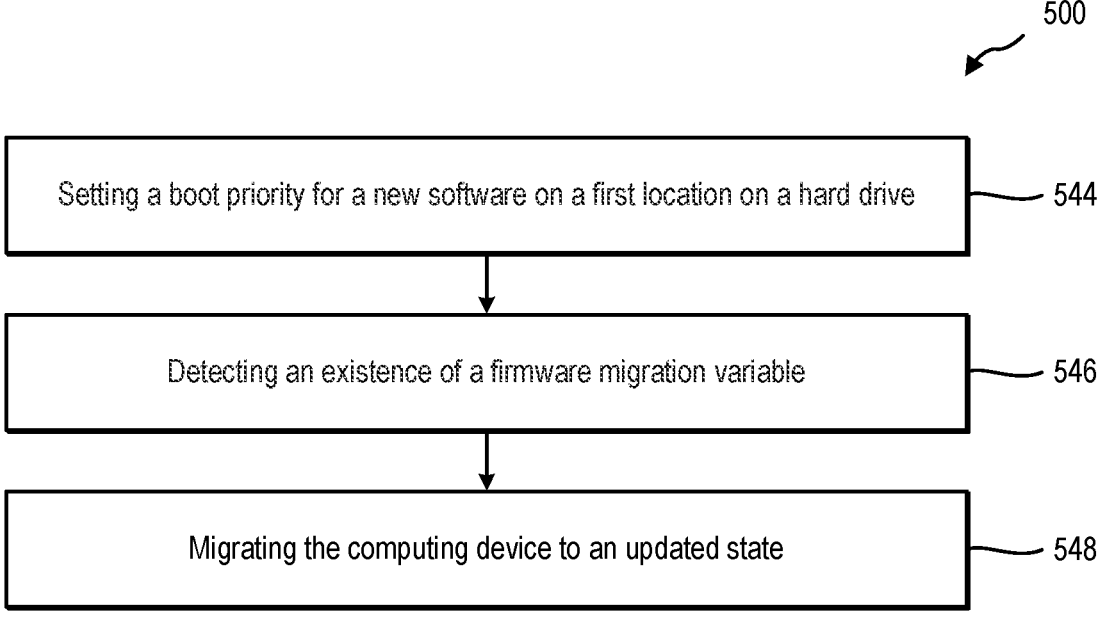
FIG. 5 illustrates a series of acts for triggering a software migration process on a computing device having a secure boot configuration policy, in accordance with one or more embodiments.

FIG. 5 illustrates a series of acts 500 for triggering a software migration process on a computing device having a secure boot configuration policy, in accordance with one or more embodiments. While FIG. 5 illustrates acts according to one or more embodiments, alternative embodiments may omit, add to, reorder, and/or modify any of the acts shown in FIG. 5. The acts of FIG. 5 can be performed as part of a method. Alternatively, a non-transitory computer-readable medium can include instructions that, when executed by one or more processors, cause a computing device to perform the acts of FIG. 5. In still further embodiments, a system can perform the acts of FIG. 5.

As shown in FIG. 5, the series of acts 500 may include an act 544 of setting a boot priority for a new software on a first location on a hard drive. In one or more embodiments, setting the boot priority for the new software forces the computing device to boot the system from the first location on the hard drive after a computing device boots up. In one or more embodiments, the new software may be a new application (such as an Internet browser, a word processing application), or an operating system (OS).

The series of acts 500 may further include an act 546 of detecting an existence of a firmware migration variable. For example, in response to detecting the existence of the firmware migration variable, the computing device is configured to delete current policy files stored in the firmware and to delete the firmware migration variable, before booting up to the new software.

The series of acts 500 may further include an act 548 of migrating the computing device to an updated state. In one or more embodiments, migrating the computing device to an updated state further includes updating a policy file stored in firmware.

Figure 6:
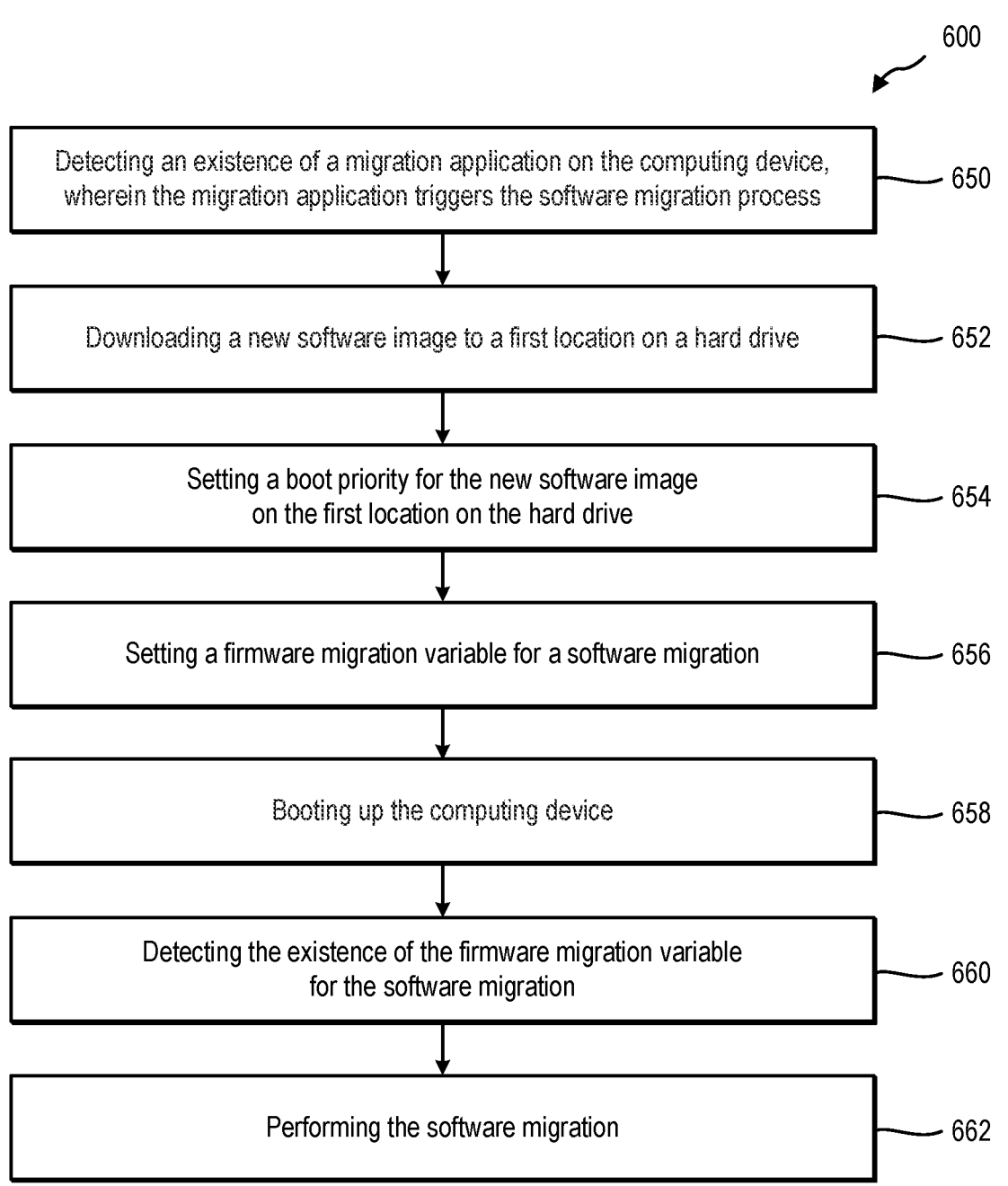
FIG. 6 illustrates a series of acts for triggering a software migration process on a computing device running a current software, in accordance with one or more embodiments.

FIG. 6 illustrates a series of acts 600 for triggering software migration process on a computing device running current software, in accordance with one or more embodiments. While FIG. 6 illustrates acts according to one or more embodiments, alternative embodiments may omit, add to, reorder, and/or modify any of the acts shown in FIG. 6. The acts of FIG. 6 can be performed as part of a method. Alternatively, a non-transitory computer-readable medium can include instructions that, when executed by one or more processors, cause a computing device to perform the acts of FIG. 6. In still further embodiments, a system can perform the acts of FIG. 6.

As shown in FIG. 6, the series of acts 600 may include an act 650 of detecting an existence of a migration application on the computing device, wherein the migration application triggers the software migration process. In one or more embodiment, the migration application is an IT administered application specifically designed to trigger a migration process on a secured computing device. In one or more embodiments, the secured computing device is configured to verify a signature of the migration application. For example, the computing device may store a plurality of verified signatures and compare the signature of the migration application to the plurality of verified signatures before allowing the software migration process. In one or more embodiments, the software migration process further includes identifying a computing device type and a current software running on the secured computing device. For example, the computing device type may be identified as Surface Hub 2S and the current software running on the secured computing device may be identified as Teams OS. In one or more embodiments, the migration application is configured to cross-reference the computing device type to a target computing device type identified by the migration application. For example, if the target computing device type is Surface Hub 2S and the computing device type is also Surface Hub 2S, then the migration process can proceed. In another example, if the target computing device is Surface Hub 2S and the computing device is Surface laptop, the migration process will not proceed as they do not match. In one or more embodiments, the migration application is further configured to cross-reference the current software running on the secured computing device to a target software identified by the migration application. For example, if the target software is Teams OS, and the secured computing device is running a Teams OS, then the migration application will proceed with the migration process. In another example, if the target software is Teams OS, but the secured computing device is running Windows 10 OS, the migration application will not proceed with the migration process.

In one or more embodiments, the software migration process further includes repartitioning a hard drive on the secured computing device. In one or more embodiments, repartitioning the hard drive includes shrinking a current system partition. For example, the hard drive may not have enough space for downloading the new software image before shrinking the current system partition. In one or more embodiments, repartitioning the hard drive further includes creating a new system update partition. For example, when migrating from a current operating system (OS) to a new type of OS, by creating a new system update partition on the hard drive, the current OS and secure boot configuration policies are stored until the new OS has been installed.

The series of acts 600 may further include an act 652 of downloading a new software image to a first location on a hard drive. In one or more embodiments, the first location on the hard drive is the new system update partition created during the software migration process as discussed earlier. In one or more embodiments, the new software image is a new operating system (OS) image. In one or more embodiments, the secured computing device is configured to access a remote site for downloading the new software image. For example, the computing device may access a publicly available store, such as Microsoft store, Microsoft Download Center, App store, or Google play to download the new software image. In one or more embodiments, the computing device is configured to access a private application and device management system that allows verified users (such as IT administrators) to download approved software to the secured computing device 202. For example, the private application and device management system may be Microsoft Intune, Google Endpoint Management, or Apple Business Manager. In one or more embodiments, the computing device is provided with appropriate URL address, by the migration application, to download the new software image.

In one or more embodiments, the computing device is configured to determine a locale type of the secured computing device and select from a plurality of new software locale types at the remote site a matching locale type for downloading. For example, if the locale type of the secured computing device is North America, the computing device is configured to download a new software having a matching locale type, i.e., Noth America locale type. Different locale type software may include, for example, different language options and other country specific configurations.

The series of acts 600 may further include an act 654 of setting a boot priority for the new software image on the first location on the hard drive. In one or more embodiments, the computing device is configured to set a boot priority for the new software on the first location on the hard drive. In one or more embodiments, setting the boot priority for the new software forces the computing device to boot the new software from the first location on the hard drive after a computing device boots up. In one or more embodiments, the new software may be a new application (such as an Internet browser, a word processing application), or an operating system (OS).

The series of acts 600 may further include an act 656 of setting a firmware migration variable for a software migration. In one or more embodiments, the firmware migration variable is configured to notify the firmware during a boot up that the software migration process has started.

The series of acts 600 may further include an act 658 of booting up the computing device. For example, the secured computing device may perform a warm reset. A warm reset closes all running programs, including the software migration application program and reinitiates a boot sequence automatically.

The series of acts 600 may further include an act 660 of detecting the existence of the firmware migration variable for the software migration. In one or more embodiments, in response to detecting the existence of the firmware migration variable, the secured computing device is configured delete current policy files stored in the firmware and to delete the firmware migration variable before booting up to the new software.

The series of acts 600 may further include an act 662 of performing the software migration. For example, the computing device may install the new software and delete the new system update partition from the hard drive.

Figure 7:
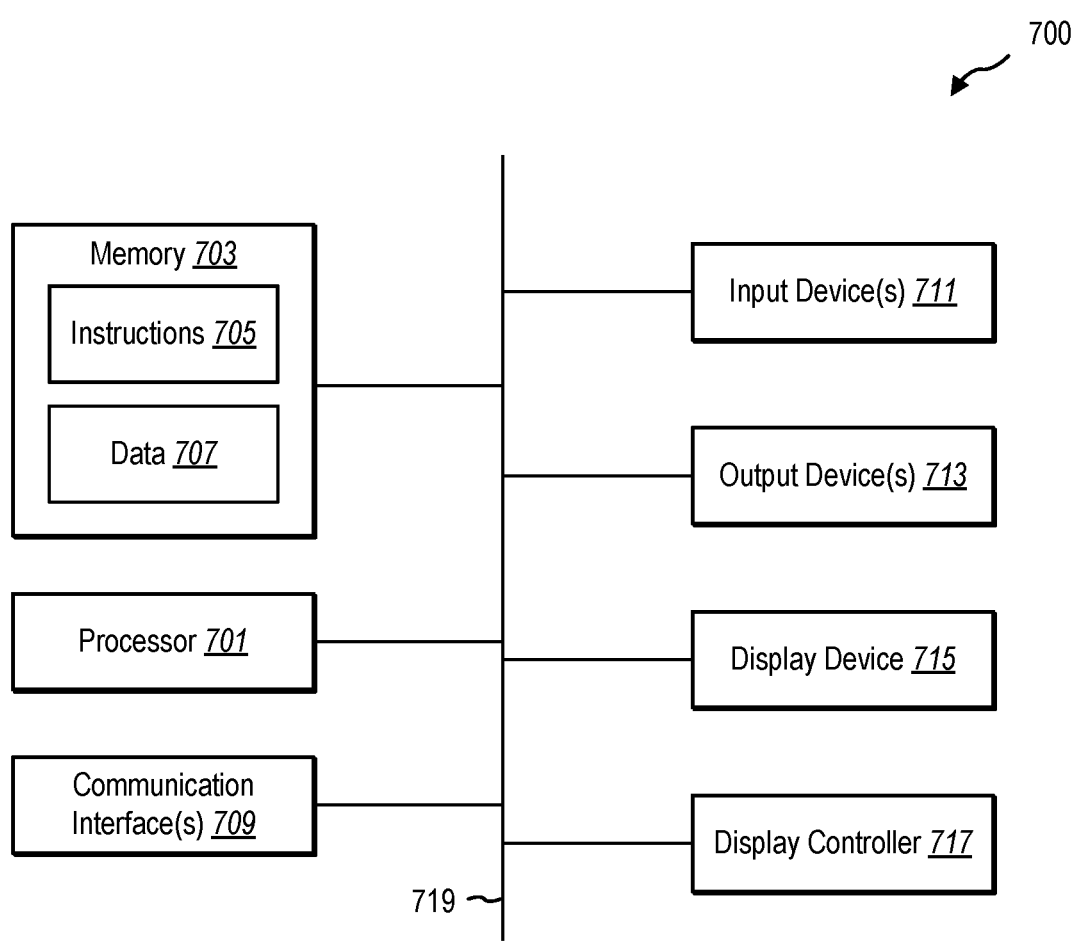
FIG. 7 illustrates certain components that may be included within a secured computing device, in accordance with one or more embodiments.

FIG. 7 illustrates certain components that may be included within a secured computing device 700, such as the secured computing device 102 of FIG. 1 or the secured computing device 202 of FIG. 2. One or more secured computing devices 700 may be used to implement the various devices, components, and systems described herein.

The secured computing device 700 includes a processor 701. The processor 701 may be a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 701 may be referred to as a central processing unit (CPU). Although just a single processor 701 is shown in the secured computing device 700 of FIG. 7, in an alternative configuration, a combination of processors (e.g., an ARM and DSP) could be used. In one or more embodiments, the secured computing device 700 further includes one or more graphics processing units (GPUs), which can provide processing services related to both neural network training and graph generation.

The secured computing device 700 also includes memory 703 in electronic communication with the processor 701. The memory 703 may be any electronic component capable of storing electronic information. For example, the memory 703 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A secured computing device 700 may also include one or more communication interfaces 709 for communicating with other electronic devices. The communication interface (s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 702.11 wireless communication protocol, a Bluetooth® wireless communication adapter, and an infrared (IR) communication port.

A secured computing device 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a secured computing device 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the secured computing device 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular datatypes, and which may be combined or distributed as desired in various embodiments.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for triggering a migration process, comprising:

at a computing device having a secure boot configuration policy:

setting a boot priority for a new software on a first location on a hard drive;

detecting an existence of a firmware migration variable;

migrating the computing device to an updated state; and deleting the firmware migration variable.

2. The method of claim 1, wherein setting the boot priority for the new software on the first location on the hard drive forces the computing device to boot from the first location on the hard drive after the computing device boots up.

3. The method of claim 1, wherein in response to detecting the existence of the firmware migration variable deleting a current policy file before booting up to the new software.

4. The method of claim 1, wherein migrating the computing device to the updated state further includes updating the secure boot configuration policy stored in firmware.

5. A method for triggering software migration process on a computing device running a current software, comprising:

detecting an existence of a migration application on the computing device, wherein the migration application triggers the software migration process, including:

downloading a new software image to a first location on a hard drive;

setting a boot priority for the new software image on the first location on the hard drive;

setting a firmware migration variable for a software migration; and booting up the computing device;

detecting the existence of the firmware migration variable for the software migration;

performing the software migration; and deleting the firmware migration variable.

6. The method of claim 5, wherein detecting the existence of the migration application is performed after a boot up.

7. The method of claim 5, wherein the method further includes identifying a computing device type and a current operating system (OS) running on the computing device.

8. The method of claim 7, wherein the method further includes cross-referencing the computing device type to a target computing device type identified by the migration application, cross-referencing the current OS running on the computing device to a target OS identified by the migration application and to proceed with the software migration process when the computing device type match with the target computing device type and when the current OS match with the target OS.

9. The method of claim 5, wherein the method further includes verifying a signature of the migration application.

10. The method of claim 5, further including repartitioning the hard drive on the computing device.

11. The method of claim 10, wherein repartitioning the hard drive further includes shrinking a current system partition.

12. The method of claim 11, wherein repartitioning the hard drive further includes creating a new system update partition.

13. The method of claim 12, wherein the new software image is downloaded to the new system update partition.

14. The method of claim 13, wherein the new software image is a new operating system image.

15. The method of claim 5, wherein downloading the new software image to the first location further includes determining a locale type of the computing device and selecting from a plurality of new software locale types, a matching locale type for downloading.

16. The method of claim 5, wherein setting the boot priority for the new software image located on the first location forces the computing device to boot the new software image from the first location on the hard drive after the computing device boots up.

17. The method of claim 12, wherein installing the new software image further includes deleting the new system update partition.

18. The method of claim 12, wherein detecting the existence of the firmware migration variable further includes migrating to the new software.

19. The method of claim 5, wherein in response to detecting the existence of the firmware migration variable deleting a current policy file before booting up to the new software.

20. A method for triggering a software migration process to an updated operating system (OS) on one or more secured computing devices, comprising:

accessing a management service; and pushing a migration application to selected the one or more secured computing devices, wherein the one or more secured computing devices each include, in firmware, a secure boot configuration policy (SBCP) and are triggered by the migration application to begin the software migration process to the updated OS after a reboot of the one or more secured computing devices based on the migration application setting a firmware migration variable that modifies the SBCP to allow the updated OS, wherein the firmware migration variable is deleted after migration.

* * * * *